United States Patent
Zifferer et al.

(10) Patent No.: US 10,926,347 B2
(45) Date of Patent: Feb. 23, 2021

(54) AUTOGENOUS SUBMERGED LIQUID DIFFUSION WELDING OF TITANIUM

(71) Applicant: Packless Industries, Waco, TX (US)

(72) Inventors: Scott Coleman Zifferer, Key Largo, FL (US); Edward A. Reed, Waco, TX (US)

(73) Assignee: Packless Industries, Waco, TX (US)

( * ) Notice: Subject to any disclaimer, the term of this patent is extended or adjusted under 35 U.S.C. 154(b) by 0 days.

(21) Appl. No.: 16/363,393

(22) Filed: Mar. 25, 2019

(65) Prior Publication Data

US 2020/0306856 A1    Oct. 1, 2020

(51) Int. Cl.
  *B23K 5/16* (2006.01)
  *B23K 5/00* (2006.01)
  B23K 103/18 (2006.01)
  B23K 103/14 (2006.01)

(52) U.S. Cl.
  CPC ............... *B23K 5/16* (2013.01); *B23K 5/003* (2013.01); *B23K 5/006* (2013.01); *B23K 2103/14* (2018.08); *B23K 2103/18* (2018.08)

(58) Field of Classification Search
  None
  See application file for complete search history.

(56) References Cited

U.S. PATENT DOCUMENTS

| | | | |
|---|---|---|---|
| 3,309,496 A | 3/1967 | Rosenberg | |
| 3,555,239 A | 1/1971 | Keith | |
| 3,957,194 A * | 5/1976 | Woodward | B23K 20/233 228/194 |
| 4,029,479 A * | 6/1977 | Parker | B23K 1/0014 428/660 |

(Continued)

FOREIGN PATENT DOCUMENTS

| | | | |
|---|---|---|---|
| CN | 102059443 | 9/2012 | |
| DE | 19926796 A1 * | 12/2000 | ........... B23K 9/0026 |
| JP | 01272750 | 10/1989 | |

OTHER PUBLICATIONS

Collier, Jody: "Titanium 101: Best TIG (GTA) Welding Practices" at https://www.millerwelds.com/resources/article-library/titanium-101-best-tig-gta-welding-practices.

(Continued)

*Primary Examiner* — Devang R Patel
(74) *Attorney, Agent, or Firm* — Kowert, Hood, Munyon, Rankin & Goetzel, P.C.; Gareth M. Sampson (57) ABSTRACT

In some embodiments, a method may bond titanium to an intermediate alloy. The method may include layering a portion of an intermediate alloy onto a portion of titanium. The method may include focusing a controlled heat source on a spot of the intermediate alloy to form a weld pool in the intermediate alloy at the spot. The method may include superheating the intermediate alloy in the weld pool above the melting point of the intermediate alloy but below the melting point of titanium such that liquid intermediate alloy contacts the surface of the portion of the titanium heating the portion of the titanium. The method may include diffusing the portions of titanium and intermediate alloy together such that upon the intermediate alloy cooling below the melting point of the intermediate alloy the portions of the intermediate alloy and titanium are bonded forming a weldment.

26 Claims, 4 Drawing Sheets

(56) References Cited

U.S. PATENT DOCUMENTS

| | | | |
|---|---|---|---|
| 4,034,906 A | | 7/1977 | Carlson et al. |
| 4,377,083 A | | 3/1983 | Shepherd et al. |
| 4,492,849 A | | 1/1985 | Biegay |
| 4,503,314 A | * | 3/1985 | Kakinni ............ B23K 35/0255 219/121.14 |
| 4,514,997 A | | 5/1985 | Zifferer |
| 4,768,495 A | | 9/1988 | Zifferer |
| 4,846,148 A | | 7/1989 | Zifferer |
| 4,988,035 A | * | 1/1991 | Ueno ................ B23K 35/0238 228/175 |
| 5,242,102 A | * | 9/1993 | Nicolas ............... B23K 20/023 228/193 |
| 5,251,693 A | | 10/1993 | Zifferer |
| 5,311,661 A | | 5/1994 | Zifferer |
| 5,409,057 A | | 4/1995 | Zifferer |
| 5,551,504 A | | 9/1996 | Zifferer |
| 5,803,128 A | | 9/1998 | Reed |
| 5,813,438 A | | 9/1998 | Reed |
| 5,819,807 A | | 10/1998 | Reed |
| 5,831,252 A | * | 11/1998 | Shimizu ............... B23K 13/015 219/603 |
| 6,488,079 B2 | | 12/2002 | Zifferer |
| 6,760,972 B2 | | 7/2004 | Zifferer |
| 6,923,035 B2 | | 8/2005 | Zifferer |
| 6,968,719 B2 | | 11/2005 | Zifferer |
| 7,694,402 B2 | | 4/2010 | Zifferer et al. |
| 7,926,160 B2 | | 4/2011 | Zifferer et al. |
| 8,434,207 B2 | | 5/2013 | Zifferer et al. |
| 8,496,160 B2 | * | 7/2013 | Kaeferlein ........... B23K 1/0008 228/178 |
| 10,221,490 B2 | | 3/2019 | Zifferer |
| 2010/0102041 A1 | | 4/2010 | Will et al. |
| 2010/0229996 A1 | | 9/2010 | Zifferer et al. |
| 2014/0042865 A1 | | 2/2014 | Mourou et al. |
| 2014/0290230 A1 | | 10/2014 | Ekstrom et al. |
| 2015/0364837 A1 | | 12/2015 | Yagi et al. |
| 2017/0032857 A1 | * | 2/2017 | Thomsen, III ........ B32B 15/017 |
| 2018/0029163 A1 | * | 2/2018 | Capostagno ........... B23K 26/14 |
| 2018/0045232 A1 | * | 2/2018 | Capostagno ....... B23K 26/0006 |

OTHER PUBLICATIONS

AZoM: "Titanium and Titanium Alloys—Welding and Brazing", Jul. 1, 2002, at https://www.azom.com/article.aspx?ArticleID=1499.

International Search Report and Written Opinion dated Jun. 15, 2020 for PCT/US20/24421 (10 pages).

* cited by examiner

AUTOGENOUS SUBMERGED LIQUID DIFFUSION WELDING OF TITANIUM

BACKGROUND OF THE INVENTION

1. Field of the Invention

The present disclosure generally relates to systems and methods directed towards autogenous submerged liquid diffusion welding. More particularly, the disclosure generally relates to systems and methods directed towards autogenous submerged liquid diffusion welding of dissimilar metals which are historically difficult to weld.

2. Description of the Relevant Art

Titanium and its alloys represent the strongest and lightest alloys available today. Titanium offers superior strength per unit weight as well as unparalleled corrosion resistance not found in any commercially viable metals which are typically used for salt water and other corrosive environments (e.g., oxidizing).

Titanium is a highly reactive material and readily reacts with oxygen, nitrogen and hydrogen and many other elements especially at typical brazing and welding temperatures. Contamination of titanium is associated with undesirable physical and corrosion characteristics. Successful alloying of titanium entails tightly controlled introduction of one or more elements: oxygen, aluminum, tin, molybdenum, chromium, vanadium and nickel. Uncontrolled alloying or contamination resulting from the heating of titanium above 400 C can lead to undesirable physical characteristics. Preventing the contamination of titanium while welding is critical to achieving quality weldments to base metals.

The cost of purchasing and the difficulty associated with manufacturing products from titanium creates a demand for joining titanium with any number of dissimilar metals that are less expensive thus reducing the cost of the final product. Titanium is typically selected for forming heat exchangers used mostly in seawater or other oxidizing liquids due to titanium's anticorrosive properties. Heat exchangers provide for energy transfer between two independent fluid streams across a shared heat exchange surface which contacts both fluid streams. Costs associated with using titanium in the production of heat exchangers could be reduced with advancements in welding titanium to dissimilar metals.

Currently welding commonly occurs in titanium via a fusion or diffusion methodology of bonding. Fusion welding brings the metals to be joined to a liquid state in an effort to have a homogenous structure that connects the two original materials with the solidified homogenized weld pool of both upon being joined. Fusion welding works best with substantially similar alloys. Fusion welding can be augmented with a like filler metal. Post weld heat treatment can be used to increase physical performance of weldment. It is less effective with dissimilar metals severely limiting alloys compatible with the fusion process.

While solid state diffusion or transient liquid phase (TLP) diffusion bonding with titanium is generally accomplished using a brazing foil or paste designed to have a lower melting point than the parent material(s) being joined. The brazing alloy is typically inserted between pieces of material to be joined and the pieces of material are pressed together to hold the pieces together to reduce warping. The entire part is then heated to a temperature in either a vacuum or a controlled inert atmosphere furnace sufficient to allow the brazing alloy to diffuse into the parent metal with a bond forming between the parts upon cooling. This process is known for high quality bonding of dissimilar metals.

A system and/or method which would facilitate the successful welding of titanium to dissimilar base metals would be beneficial to increasing the utility of titanium based products by decreasing manufacturing costs.

SUMMARY

High temperature welding of titanium directly to dissimilar metals has a very limited number of alloy options. This is due to the reactive nature of titanium and the formation of intermetallic compounds that weaken the physical and corrosion resistant characteristics of titanium. The ability to create high strength bonds between titanium and an increased number of alloys extends the use of titanium and allows metals with different characteristics to be combined with titanium for more versatile products at lower costs.

In some embodiments, a method may bond titanium to an intermediate alloy. The method may include layering a portion of an intermediate alloy onto a portion of titanium. The method may include focusing a controlled heat source on a spot of the intermediate alloy to form a weld pool in the intermediate alloy at the spot. The method may include superheating the intermediate alloy in the weld pool above the melting point of the intermediate alloy but below the melting point of titanium such that liquid intermediate alloy contacts the surface of the portion of the titanium heating the portion of the titanium. The method may include diffusing the portions of titanium and intermediate alloy together such that upon the intermediate alloy cooling below the melting point of the intermediate alloy the portions of the intermediate alloy and titanium are bonded forming a weldment.

In some embodiments, the method includes submersion shielding of titanium at the spot beneath a liquid pool of the intermediate alloy which prohibits atmospheric contamination of titanium at the spot.

In some embodiments, the method includes submersion shielding of titanium at the spot beneath a liquid pool of the intermediate alloy which boils off contaminants at the spot.

In some embodiments, the method includes superheating the intermediate alloy in the weld pool such that sufficient energy is supplied to exceed the beta-Ti transformation temperature transitioning the portion of the titanium to a body-centered cubic beta-Ti crystal phase resulting in a volumetric expansion of the portion of the titanium which disrupts the oxide layer as the portion of the titanium expands. The expansion of the portion of the titanium may function in concert with the liquid pool of the intermediate alloy to dislodge and interrupt the continuity of the titanium-oxide layer exposing oxide-free titanium to the liquid intermediate allow greatly decreasing diffusion resistance of titanium-oxide.

In some embodiments, the intermediate alloy comprises aluminum, copper, or cupronickel.

In some embodiments, the method further includes cleaning the portions of the intermediate alloy and the titanium.

In some embodiments, the method further includes applying an inert gas to the portions of the intermediate alloy and the titanium. The inert gas may include argon.

In some embodiments, superheating the intermediate alloy in the weld pool above the melting point comprises heating the intermediate alloy above a transus temperature of titanium. Heating the weld pool above the transus temperature of titanium transitions the portion of the titanium from a hexagonal close-packed crystalline structure to a body-centered cubic crystalline structure.

In some embodiments, layering includes putting the portion of the intermediate alloy in direct contact with the titanium. Layering may include putting the portion of the intermediate alloy in direct contact with the titanium such that a mechanical bond is formed between the two portions. Layering may include swaging, drawing, stamping, pressing or crimping or other methodology.

In some embodiments, focusing the controlled heat source on a spot of the intermediate alloy includes focusing the controlled heat source of the intermediate alloy (IA) as the heat source moves across the surface limiting total exposure to heat source to seconds.

In some embodiments, the method includes positioning the controlled heat source or the portions of titanium and intermediate alloy along a weld line using a precision controlled positioning mechanism.

In some embodiments, a system may bond titanium to an intermediate alloy. The system may include a controlled heat source, an inert gas source, and a precision controlled positioning mechanism. The controlled heat source may focus, during use, on a spot of a portion of an intermediate alloy layered onto a portion of titanium to form a weld pool in the intermediate alloy at the spot. The controlled heat source may superheat, during use, the intermediate alloy in the weld pool above the melting point of the intermediate alloy but below the melting point of titanium such that liquid intermediate alloy contacts the surface of the portion of the titanium heating the portion of the titanium. The controlled heat source may diffuse, during use, the portions of titanium and intermediate alloy together such that upon the intermediate alloy cooling below the melting point of the intermediate alloy the portions of the intermediate alloy and titanium are bonded forming a weldment.

In some embodiments, a system may include an inert gas source which provides, during use, an inert gas around all areas of the work piece to experience temps great than 600 C the reactive temperature.

In some embodiments, a system may include a precision controlled positioning mechanism configured to position the controlled heat source or the portions of titanium and intermediate alloy along a prescribed weld line on the IA.

BRIEF DESCRIPTION OF THE DRAWINGS

Advantages of the present invention may become apparent to those skilled in the art with the benefit of the following detailed description of the preferred embodiments and upon reference to the accompanying drawings.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task. In some contexts, "configured to" may be a broad recitation of structure generally meaning "having systems that" performs the task or tasks during operation. As such, the component can be configured to perform the task even when the component is not currently on. In general, the circuitry that forms the structure corresponding to "configured to" may include systems or apparatuses.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or particular fluid systems, which may, of course, vary. It is also to be understood that the terminology used herein is for the purpose of describing particular embodiments only and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "base metal" as used herein generally refers to either the titanium welded to the IA or a third alloy or base material to be welded to the IA.

The term "connected" as used herein generally refers to pieces which may be joined or linked together.

The term "coupled" as used herein generally refers to pieces which may be used operatively with each other, or joined or linked together, with or without one or more intervening members.

The term "direct" or "directly" as used herein generally refers to one structure in physical contact with another structure, or, when used in reference to a procedure, means that one process effects another process or structure without the involvement of an intermediate step or component.

The term "intermediate alloy" as used herein generally refers to a base metal capable of alloying with titanium in a substitutional fashion due to having minimal difference in atomic size between titanium and the base metal (within approximately 10%). The intermediate alloy may include aluminum, copper, or cupronickel or various alloy combinations of same.

The term "weldment" as used herein generally refers to a unit formed by welding together an assembly of pieces on an atomic level.

Embodiments

In some embodiments, the methods and systems described herein are intended to describe autogenous submerged liquid diffusion bonding of an IA to titanium. This bonding facilitates the IA as a functional composite part welded to the titanium base structure. Alternately the IA could be tasked as a bonding agent that once welded to titanium can be welded or brazed with an array of structural alloys (e.g., aluminum, steel, stainless, copper, etc.), effectively "welding" substantially dissimilar metals to titanium.

In some embodiments, autogenous submerged liquid diffusion welding of titanium involves a method and process for making a "diffusion" bond between titanium and an IA that has a substantially lower melting point than titanium that is weldable to other alloys. In some embodiments, the process layers an IA onto titanium which is passed under a pin point heat source that creates a sub meniscus sized liquidus column of the IA, wetting the titanium. The molten IA is superheated but kept below the liquidus of close-packed (CP) titanium. The molten column follows the movement of the heat source across the surface of the IA. The boundary layer between the liquid and the titanium creates a weld zone of accelerated liquid diffusion (LD). The titanium and weld zone are shielded from the gaseous contamination by the IA weld pool. The process may occur in seconds (as opposed to current methods which require minutes or hours), thus limiting the time and material volume experiencing reactive temperature exposure, and grain growth in the weldment. The heat-affected zone of the parts to be bonded are limited to the local area immediately surrounding the weld. The vast majority of the mass of the parts are completely unaffected by the Liquid Diffusion process and as such retain the original pre-weld strength. The titanium base metal is unaffected directly by the surface diffusion and resumes it original structure, composition and corrosion resistance, unaffected by the diffusion alloying and bonding on its surface.

The short time at temperature prevents diffusion and or erosion of the titanium beyond the outermost atomic layers of the base metal and limits grain growth of surrounding material. The weldment rapidly cools beginning within seconds of initial application of heat (e.g., with cooling of up to 100° C. per second). Upon solidification, the liquid diffusion zone solidifies into a weld zone bond that is encapsulated between the titanium base and an IA casing. This method is useful with copper, cupronickel, and aluminum alloys acting as an IA all of which are known to be compatible with titanium. In some embodiments, the autogenous submerged liquid diffusion (ASLD) is a uniquely simple process that is complete in seconds and does not require a vacuum, a vacuum furnace, weld chamber or controlled atmosphere chamber, alloyed filler wire, heating of the entire part, or post weld heat-treatment like many conventional titanium welding or brazing processes.

In some embodiments, diffusion bonding is based at least based in part on the concept that titanium exists in two district crystalline forms between room temperature and its liquidus temperature. The alpha-Ti phase hexagonal close-packed (HCP) exists until the transus temperature (approximately 760° C.) is exceeded above which the crystal structure changes to Body-Centered Cubic (BCC). Nickel and copper are insoluble in the alpha-Ti phase; however, upon transitioning to the beta-Ti phase some metals such as nickel and copper are increasingly soluble above the beta transition temperature.

Aluminum melts at 660° C. and has a face-centered cubic crystalline structure. Aluminum is an Alpha Phase stabilizer, meaning it raises the transus temperature. Aluminum is routinely alloyed with titanium for increasing strength, ductility, and other characteristics required by, for example, the aerospace industry. Aluminum can lose its three outermost electrons and as such can combine readily with other elements given sufficient energy. Aluminum is readily soluble with titanium to a limit of 8% by wt. yielding increasing strength and ductility. Beyond 8% undesirable intermetallic compounds form as result of excess aluminum.

Oxygen-free copper (OFC) or oxygen-free high thermal conductivity (OFHC) copper is a group of wrought high conductivity copper alloys that have been electrolytically refined to reduce the level of oxygen to 0.001% or below. Oxygen-free copper has sufficiently low oxygen to be used as an IA assuming a limited time and energy to diffuse into the titanium interstitially.

Cupronickel combines two elements with nearly identical atomic sizes 1.97 A for nickel and 1.96 A for copper and share similar electron affinity such that they alloy completely across the entire range of compositions. Titanium has an atomic size of 2.11 A suggesting that both copper and nickel could alloy with titanium in a substitutional fashion having only a small difference in atomic size. In a Ti—Ni binary system, nickel functions as a beta stabilizer which forms an eutectic composition with titanium and lowers the liquidus temperature with increasing molecular content. The diffusion rate of nickel with titanium increases from the 760° C. beta transformation temperature and accelerates as it becomes liquid Cu—Ni at 1100° C. and continues throughout the superheated temperature range. Trace substitutional alloying of nickel with titanium has proven to improve strength and increase corrosion resistance and while lowering the Beta-Ti transformation temperature.

The melting point of Cu—Ni is approximately 1100° C., approximately 350° C. above the Beta-Ti transformation temperature. The alloying effect of nickel accelerates diffusion with titanium at temperatures between approximately 760° C. (the Beta-Ti Transition) up to 1643° C. (the titanium liquidus). Limiting the amount of molecular nickel available, a Beta phase stabilizer at the diffusion zone, and limiting the exposure time above the Beta transition temperature results in increased strength and corrosion resistance. Nickel additionally reduces the formation of intermetallic compounds in CP titanium resulting in increased weld zone integrity. Copper is close in atomic size and lends itself to substitutional alloying on the titanium boundary much like nickel. The Hume-Rothery rule suggests that the Ti, Cu and Ni elements can substitutionally alloy with each other given proper conditions.

In some embodiments, submerged liquid diffusion bonding with titanium is performed by the submersion shielding of solidified titanium beneath a liquid pool of IA superheated to a temperature below the liquidus temperature of the titanium base metal. The superheated liquid IA is in wetted contact with the solidified titanium base metal and the excess energy of the molten liquid drives thermochemical diffusion across the liquid solid boundary. The substitutional alloying of the diffused elements bonds the parent titanium surface to the element in the liquid form of the IA.

In some embodiments, a method includes layering an IA onto titanium by swaging, drawing, crimping, stamping or other forming techniques that puts the IA in direct contact with the titanium to the point of a mechanical bond, such that no gap exists between the ultra-clean surfaces of the two metals. The IA must be selected from substitutionally compatible elements for diffusion with titanium per the Hume-Rothery theorem. The diffusion will be more effective given the unit time for alloys which have a significantly lower melting point than titanium. Aluminum, copper, and cupronickel all qualify as potential IAs for a titanium diffusion bond.

The same titanium oxide layer that protects the titanium from oxidizing also inhibits diffusion. The titanium beneath the superheated liquified IA weld pool absorbs enough energy to exceed the beta-Ti transformation temperature (BTT) transitioning the titanium to a body-centered cubic beta-Ti crystal phase. The resulting body-centered cubic atomic structure results in a volumetric expansion of the titanium which disrupts the oxide layer as it expands. When combined with the IA molten liquid wetting of the oxide layer they act together to dislodge and interrupt the continuity of the Ti-oxide layer exposing oxide-free titanium to the liquid IA. Autogenous submerged liquid diffusion provides a liquid medium of increasing heat gradient that leads away from the titanium towards the heat source. This gradient allows dislodged titanium oxides to diffuse into the weld pool and not gather on a plane delineated by the bond line. Volumetrically, the oxides are a small percentage of the weld pool volume. Diluting the oxide concentration in the weld pool overcomes the problem associated with solid-state and TLP diffusion bonding which collects oxides on a common plane in the weldment.

In some embodiments, a precision-controlled heat source (e.g., Gas Tungsten Arc Welding, Plasma, Laser, Electron beam ("TIG"), etc.) creates a sub meniscus sized superheated liquid column of the IA. This column of molten metal is held by the meniscus and wetting force of the molten pool against the titanium. The molten pool of IA is superheated but kept below the liquidus of CP titanium. The molten column follows the movement of the heat source across the surface of the IA. The boundary layer between the liquid IA and the titanium creates a weld zone of accelerated Liquid Diffusion (LD) which is shielded from the gaseous contamination by the IA weld pool.

The process uses the large differential between the melting point of titanium 1623° C. and the IAs (e.g., copper 1063° C., Cu—Ni 1100° C., or aluminum 660° C.) to create a thermally driven liquid diffusion zone that wets liquid IA to the titanium. The heat from the superheated liquid IA elevates the titanium above the Beta-Ti transition temperature converting to body-centered cubic where bi-directional diffusion and substitutional alloying can readily occur. The beta-titanium phase is the more volumetric and less dense BCC structure and is susceptible to accelerated diffusion rates. The excess energy in the superheated liquid drives up the energy for diffusion and solubility of the diffusion zone.

The IA will be liquid before the titanium reaches the transus temperature thus allowing any moisture or trapped gas to escape thru the molten pool before the transus temp is reached further reducing the possible formation of unwanted interstitial contamination. Oxides may diffuse and float up through the molten weld pool instead of forming a single layer which would weaken bond.

Solidification of the weld upon cooling leaves the submerged liquid diffusion zone encapsulated between the titanium and the IA. Both the titanium and the IA act as heatsinks having many times the volume of the weldment assisting rapid cooling and solidification. The weldment bonds the titanium to the IA on an atomic level. The weldment is bonded and atomically connected to the unalloyed titanium base metal and the solidified IA casing both of which add strength via their own properties to the weldment. The process "time at temperature" (i.e., the length of time at which the metals are held at the desired temperature during bonding) and available alloying elements constrain the level and distance of diffusion in both the titanium and weld pool of the IA, inhibiting the formation of undesirable intermetallic compounds in the weldment.

Figure 1:
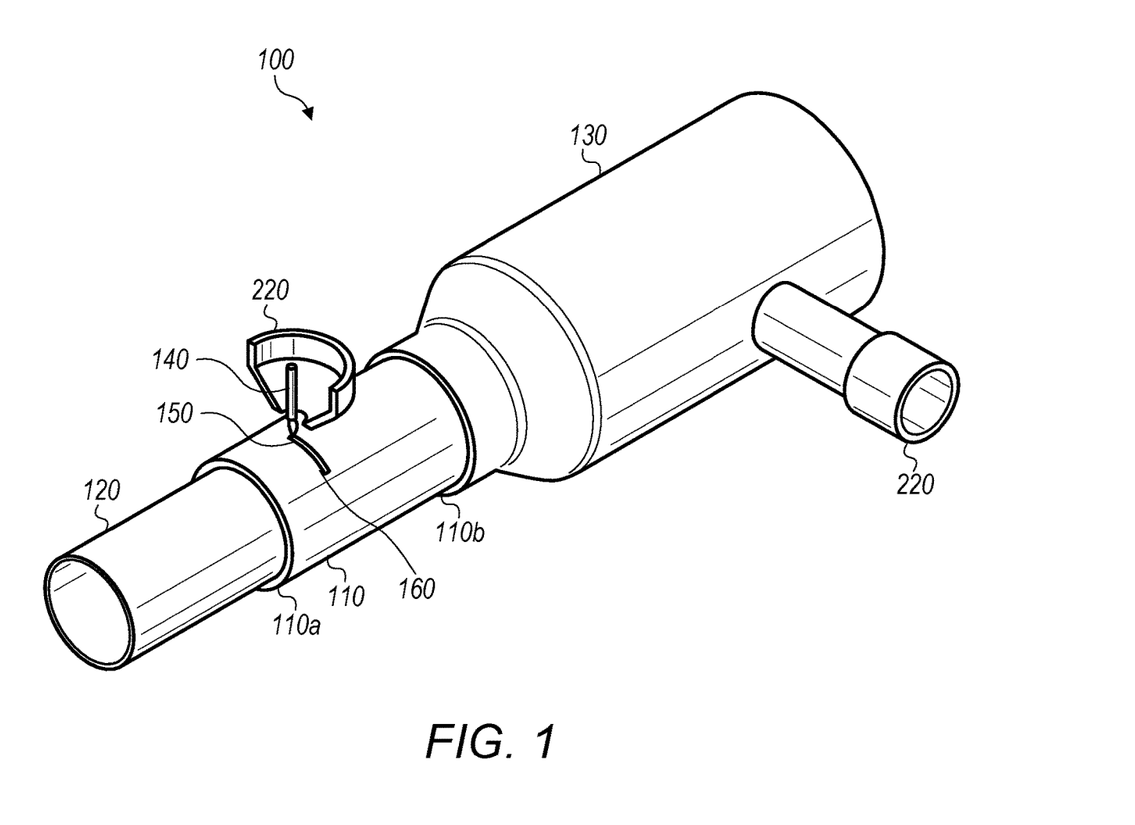
FIG. 1 depicts an embodiment of a perspective view of a system and method for submerged diffusion welding using copper-nickel as an intermediate alloy to weld titanium to a di-similar metal.
Figure 2:
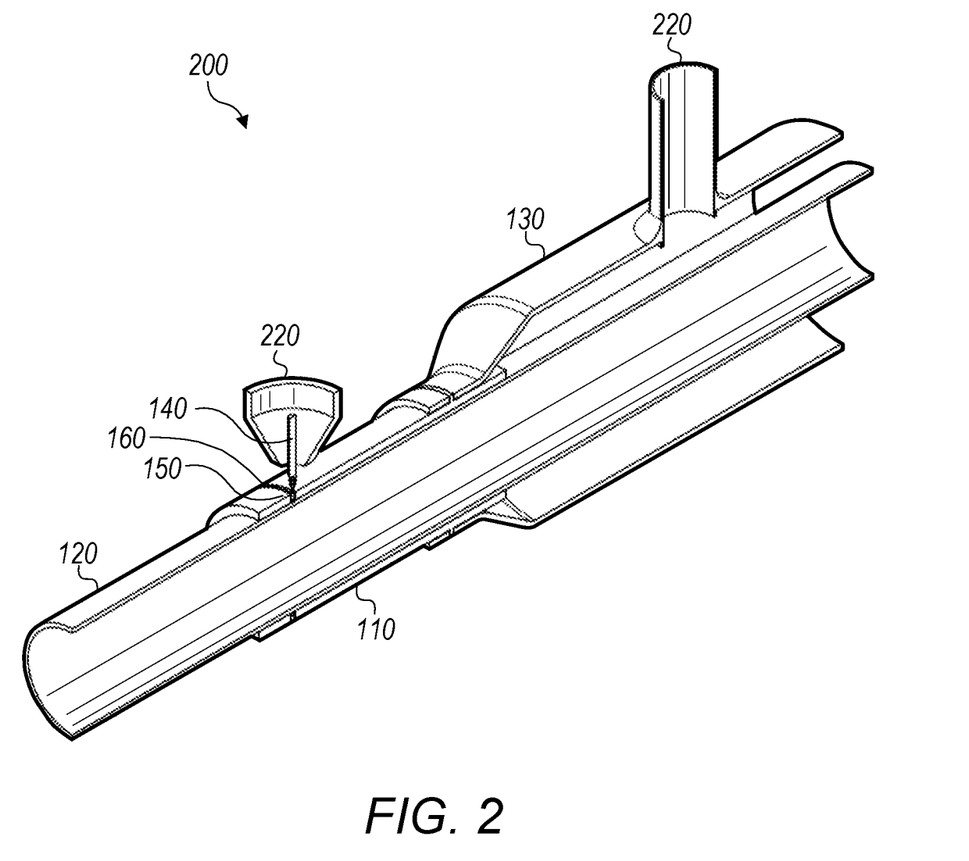
FIG. 2 depicts an embodiment of a perspective cross-sectional view of a system and method for submerged diffusion welding using copper-nickel as an intermediate alloy to weld titanium to a di-similar metal.

FIGS. 1-2 depict an embodiment of a system 100 for diffusion bonding a Cu—Ni alloy tubing 110 employed as an IA to titanium tubing 120 on a first end 110a of the Cu—Ni tubing. FIGS. 1-2 further depict an alternate dissimilar metal 130 that typically cannot be welded or brazed to titanium but can be welded to the Cu—Ni tubing on the second end 110b (in the depicted embodiment) opposite to the first end 110a. FIGS. 1-2 illustrate an example, using titanium tubing and an IA of Cu—Ni tubing swaged tightly to the titanium base metal tubing. The methods described transverses the Cu—Ni with a pinpoint energy source 140 along a weld zone 150 (e.g., TIG or GTAW).

Figure 3:
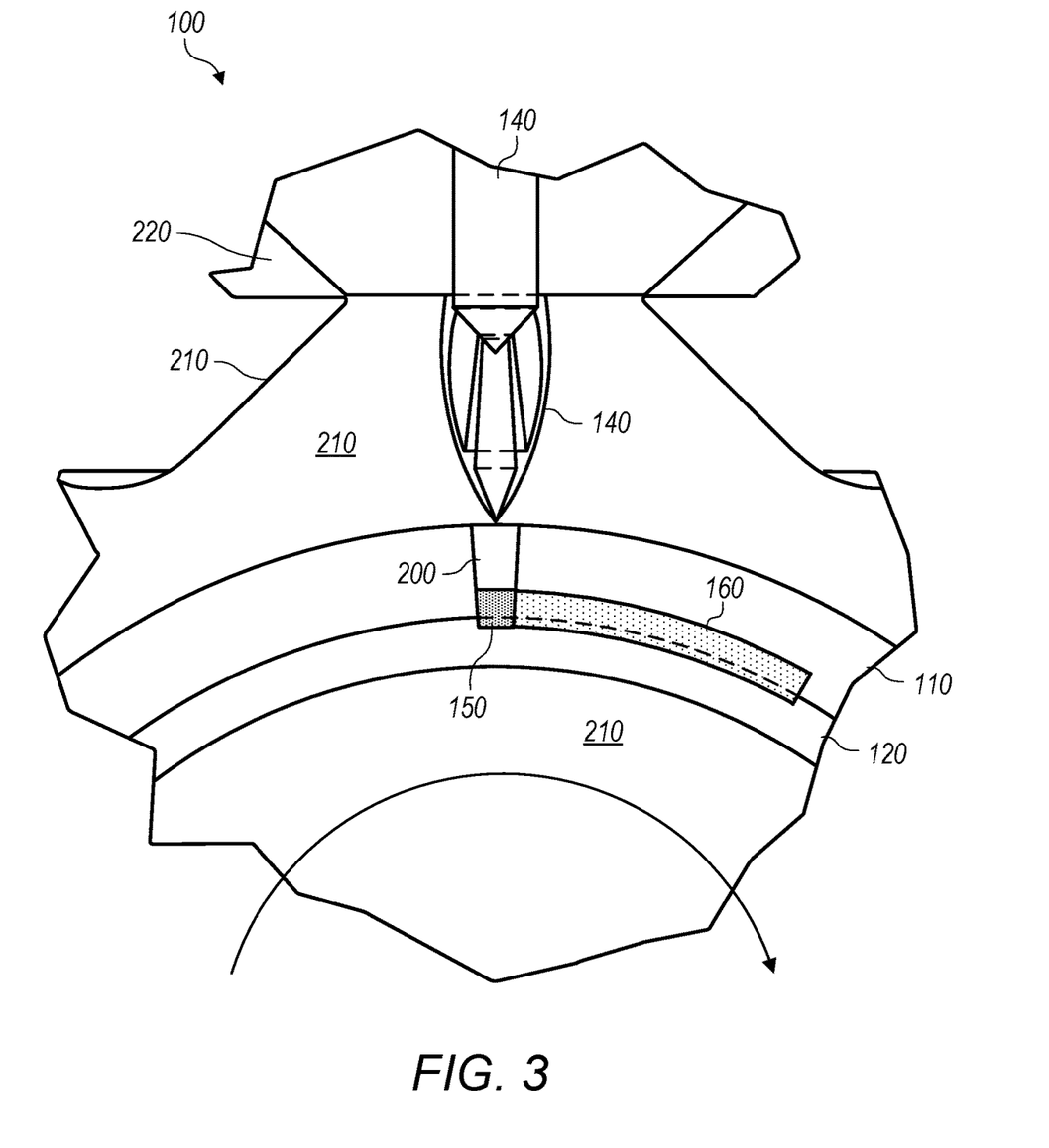
FIG. 3 depicts an expanded cross-sectional view of the embodiment depicted in FIGS. 1-2.

FIG. 3 depicts an expanded cross-sectional view of the embodiment depicted in FIGS. 1-2. The pinpoint energy source 140 may function to liquefy and superheat a submeniscus sized column 200 of the Cu—Ni in wetted contact with the titanium. This column of superheated liquid Cu—Ni may shield the titanium diffusion zone 150 from gaseous contamination while providing a liquefied diffusion medium with enough thermal energy to react with the titanium base metal. The liquefied Cu—Ni and the heat-affected zone are shielded from the atmosphere with a high purity inert gas 210 (e.g., provided by one or more inert gas sources 220) while above 400° C. The heat-affected zone may be purged with inert gas until the weld cools and solidifies into a solidified weldment zone 160.

In the depicted example the alloying effect of nickel accelerates diffusion with titanium at temperatures between approximately 760° C. and 1643° C., the titanium liquidus. Limiting the amount of molecular nickel available, a Beta phase stabilizer at the diffusion zone and limiting the exposure time above Beta transition temp, reduces the erosion effect of nickel while gaining strength and corrosion resistance from its substitutional alloying. Nickel may reduce the formation of intermetallic compounds in CP titanium increasing weld zone integrity.

In some embodiments, the IA sleeve (e.g., depicted in FIGS. 1-3) allows the offsetting of the second weld between the dissimilar base metal and the IA. The second weld is intended to fuse the base metal to the IA, leaving the underlying titanium unfused and unaffected by the second weld or potential of contamination by this alloy.

The gauge for the intermediate diffusion alloy is selected to sustain the planned service and operating conditions and burst pressures of the related vessel effectively bridging the physical gap using its mutual weldability and physical properties. The welding of incompatible alloys by creating a first weldment between titanium and the IA and a second different weld between the IA and incompatible metals (e.g., aluminum, copper, steel, stainless etc.) effectively expands the number of alloys that can be welded to titanium.

The use of an IA provides a methodology to partially absorb the effects of the differing coefficients of expansion of the metals to be welded to titanium. The distance between welds and the ductility of the IA acts to absorb the difference in coefficient of thermal expansion between the dissimilar alloys. Most metal expands at a faster rate than titanium with increasing temperature, both weldments are partially isolated by the elastic deformation of the IA connecting the welds. The IA may serve as a thermal expansion shock absorber, using its elastic deformation to partially absorb the differing coefficient of expansion for the dissimilar alloys. As a thermal expansion shock absorber the AI may effectively reduce thermally-induced stress on the weld(s).

Figure 4:
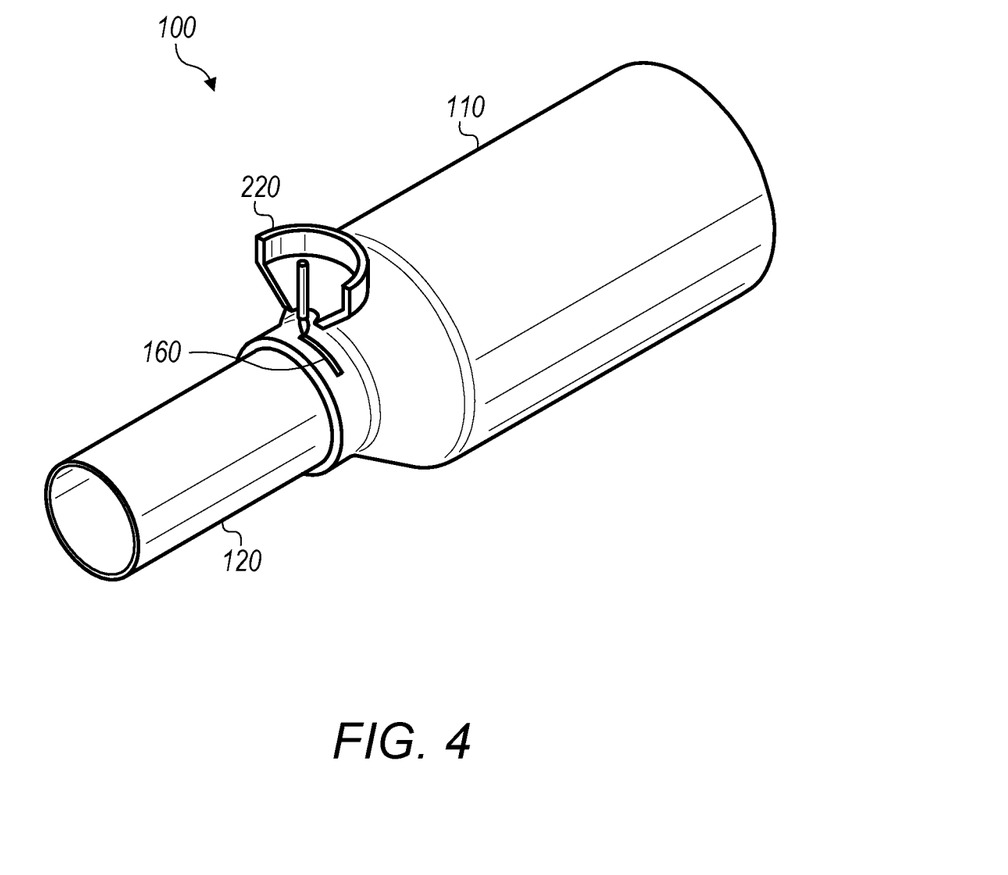
FIG. 4 depicts an embodiment of a system and method for submerged diffusion welding directly to copper-nickel.

FIG. 4 depicts an embodiment of direct usage of the copper-nickel IA 110 as a functioning component of the composite device. The resulting heat exchanger shown in FIG. 4 has the corrosion-resistive properties of titanium 120 on the inner tube for seawater. The outer lower cost alloy 110 encapsulates the second circuit for refrigerant. The dissimilar metals are welded to form a composite-pressure capable, highly corrosion resistant device at a lower material cost than an all titanium device would be.

In some embodiments, methods described herein include cleaning the titanium and IA and/or ensuring the titanium and IA are clean. Ensuring the titanium is clean cannot be overemphasized. It is important that as much of any of the oxide layer at the weld zone be removed prior to joining. Mechanical methods may be used to remove the oxide layer (e.g., grinder, file, etc.). Chemical solutions and/or compositions may be used to remove oxide layers (e.g., nitric acid solution, hydrofluoric acid, etc.). Mechanical and chemical methods may be used in combination to remove oxide layers from a weld zone. Any oils, dirt, or other contaminants need to be removed from the metal surfaces as well. Chemicals such as acetone or methyl ethyl ketone (MEK) may be used to remove many contaminants. Mechanical means such as lint-free cloth may be used to remove contaminants from weld zones.

In some embodiments, the method may include using a source of inert gas to provide a blanket of inert gas. The inert gas may be directed towards the point of the weld. The inert gas may be used to pre- and post-saturate/purge/flood of all titanium exposed to reactive heat. The inert gas may be used to flood the weld zone during welding above and/or below the weld zone. The inert gas may have a high purity such that there are few contaminants and little to no oxygen present in the inert gas (e.g., no more than 20 ppm of oxygen present in the inert gas). However, as opposed to many current methods of welding titanium, much less inert gas is needed because of the small area which is welded and the rapid reduction of temperature of the weld to near room temperature (at which point the inert atmosphere is no longer needed).

In some embodiments, the method may include a programmable mechanical system which moves the heat source or the work material. A computer controlled positioning system may ensure a proper solid weld. The computer controlled positioning system may ensure that the controlled heat source moves at an appropriate pace such that the weld pool attains an appropriate minimum temperature without going over the melting point of titanium while allowing the weld pool to maintain the desired temperature range for a sufficient amount of time to allow adequate diffusion to occur. The positioning system may include device which allows for remote determination of the temperature of the weld such that the positioning system may adjust as necessary the rate of movement of the heat source and/or the temperature of the heat source to achieve a solid weld. In some embodiments the positioning system may move the heat source relative to the metals to be welded (e.g., in the case of large planar sheets). In some embodiments the positioning system may move the metals to be welded relative to the heat source (e.g., in the case of metal tubes or conduits). In some embodiments, one may turn the part or weld head with a lathe without computer control; however some type of precision control is needed.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of bonding titanium to an intermediate alloy, comprising:

layering a portion of an intermediate alloy onto a portion of titanium;

focusing a controlled heat source on a spot of the intermediate alloy to form a weld pool in the intermediate alloy at the spot;

superheating the intermediate alloy in the weld pool above the melting point of the intermediate alloy but below the melting point of titanium to form a meniscus of a superheated liquid column of the intermediate alloy in the weld pool, wherein the superheated liquid column is in contact with titanium below the superheated liquid column and the superheated liquid column heats the titanium below the superheated liquid column and the titanium, wherein the superheated liquid column is held in contact against the titanium below the superheated liquid column by a meniscus force such that the superheated liquid column submersion shields the titanium below the superheated liquid column from atmospheric contamination, and wherein the titanium below the superheated liquid column and intermediate alloy diffuse together in the diffusion zone while the intermediate alloy is superheated; and allowing the diffusion zone to cool below the melting point of the intermediate alloy, wherein the intermediate alloy and the titanium in the diffusion zone are bonded to form a weldment from the diffusion zone.

2. The method of claim 1, wherein submersion shielding of the titanium at below the superheated liquid column of the intermediate alloy boils off contaminants from the diffusion zone.

3. The method of claim 1, wherein the diffusion zone is heated by the superheated liquid column to a temperature above a beta-Ti transition temperature and below a liquidus temperature of the titanium in the diffusion zone such that at least some titanium in the diffusion zone is transformed to a body-centered cubic beta-Ti crystal phase that results in a volumetric expansion of the at least some titanium, wherein the volumetric expansion disrupts an oxide layer of the at least some titanium as the titanium expands, and wherein the volumetric expansion functions in concert with the superheated liquid column of the intermediate alloy to dislodge and interrupt the continuity of the oxide layer and expose highly reactive oxide-free titanium to the superheated liquid column, thereby increasing diffusion rates in the diffusion zone.

4. The method of claim 1, wherein the diffusion zone is heated by the superheated liquid column to a temperature above a beta-Ti transition temperature and below a liquidus temperature of the titanium in the diffusion zone such that at least some titanium in the diffusion zone is transformed to a body-centered cubic beta-Ti crystal phase that results in a volumetric expansion of the at least some titanium, and wherein the volumetric expansion disrupts an oxide layer of the at least some titanium as the titanium expands.

5. The method of claim 1, wherein the intermediate alloy comprises aluminum, copper, or cupronickel or various alloy combinations of same.

6. The method of claim 1, further comprising cleaning the portions of the intermediate alloy and the titanium.

7. The method of claim 1, further comprising applying an inert gas to a surface of the portion of the titanium opposite a surface of the titanium below the superheated liquid column that, is in contact with the superheated liquid column.

8. The method of claim 7, wherein the inert gas comprises argon.

9. The method of claim 1, wherein superheating the intermediate alloy in the weld pool above the melting point comprises heating the intermediate alloy above a transus temperature of titanium.

10. The method of claim 1, wherein the superheated liquid column heats the titanium below the superheated liquid column to a temperature above a transus temperature of titanium such that the portion of the titanium transitions from a hexagonal close-packed crystalline structure to a body-centered cubic crystalline structure.

11. The method of claim 1, wherein layering comprises swaging, drawing, or crimping.

12. The method of claim 1, wherein layering comprises putting the portion of the intermediate alloy in direct contact with the titanium.

13. The method of claim 1, wherein layering comprises putting the portion of the intermediate alloy in direct contact with the titanium such that a mechanical bond is formed between the two portions.

14. The method of claim 1, wherein focusing the controlled heat source on the spot of the intermediate alloy comprises focusing the controlled heat source for seconds not minutes or hours.

15. The method of claim 1, further comprising positioning the controlled heat source or the portions of titanium and intermediate alloy along a weld line using a precision controlled positioning mechanism.

16. A method of bonding titanium to an intermediate alloy, comprising:

layering a portion of an intermediate alloy onto a portion of titanium such that the intermediate alloy is in direct contact with the titanium;

focusing a controlled heat source on a spot of the intermediate alloy to form a weld pool in the intermediate alloy at the spot;

superheating the intermediate alloy in the weld pool above the melting point of the intermediate alloy and above the transus temperature of titanium but below the melting point of titanium to form a meniscus of a superheated liquid column of the intermediate alloy in the weld pool, wherein the superheated liquid column is in contact with titanium below the superheated liquid column and the superheated liquid column heats the titanium below the superheated liquid column to form a diffusion zone at a boundary between the superheated liquid column and the titanium, wherein the superheated liquid column is held in contact against the titanium below the superheated liquid column by a meniscus force such that the superheated liquid column submersion shields the titanium below the superheated liquid column from atmospheric contamination, and wherein the titanium below the superheated liquid column and intermediate alloy diffuse together in the diffusion zone while the intermediate alloy is superheated; and allowing the diffusion zone to cool below the melting point of the intermediate alloy, wherein the intermediate alloy and the titanium in the diffusion zone are bonded to form a weldment from the diffusion zone.

17. The method of claim 16, wherein the intermediate alloy comprises aluminum, copper, or cupronickel.

18. The method of claim 16, further comprising cleaning the portions of the intermediate alloy and the titanium.

19. The method of claim 16, further comprising applying an inert gas to a surface of the portion of the titanium opposite a surface of the titanium below the superheated liquid column that is in contact with the superheated liquid column.

20. The method of claim 19, wherein the inert gas comprises argon.

21. The method of claim 16, wherein the superheated liquid column heats the titanium below the superheated liquid column to a temperature above the transus temperature of titanium such that the portion of the titanium transitions from a hexagonal close-packed crystalline structure to a body-centered cubic crystalline structure.

22. The method of claim 16, wherein layering comprises swaging, drawing, or crimping.

23. The method of claim 16, wherein layering comprises putting the portion of the intermediate alloy in direct contact with the titanium such that a mechanical bond is formed between the two portions.

24. The method of claim 16, wherein focusing the controlled heat source on the spot of the intermediate alloy comprises focusing the controlled heat source for less than five seconds.

25. The method of claim 16, further comprising positioning the controlled heat source or the portions of titanium and intermediate alloy along a weld seam using a computer controlled positioning mechanism.

26. The method of claim 1, wherein the titanium below the superheated liquid column and the intermediate alloy in the diffusion zone substitutionally alloy with each other in the diffusion zone while the intermediate alloy is superheated.

* * * * *

UNITED STATES PATENT AND TRADEMARK OFFICE
CERTIFICATE OF CORRECTION

| | | |
|---|---|---|
| PATENT NO. | : 10,926,347 B2 | Page 1 of 1 |
| APPLICATION NO. | : 16/363393 | |
| DATED | : February 23, 2021 | |
| INVENTOR(S) | : Scott Coleman Zifferer and Edward A. Reed | |

It is certified that error appears in the above-identified patent and that said Letters Patent is hereby corrected as shown below:

In the Claims

Claim 1, Column 11, Line 12, after the word column, please add --to form a diffusion zone at a boundary between the superheated liquid column--.

Claim 7, Column 11, Line 64, delete "," between that and is.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*